June 7, 1938.  M. NAËDER  2,119,999
WELDING STRIP
Filed Feb. 14, 1936
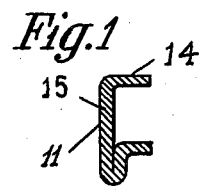
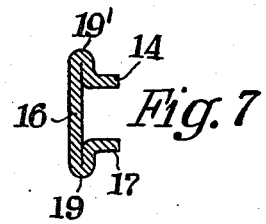
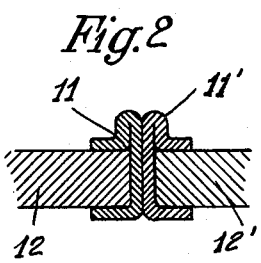
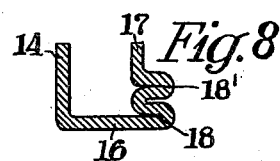
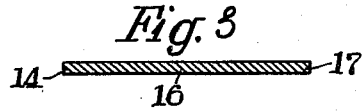
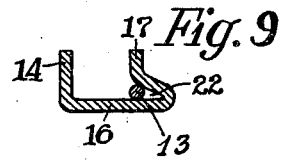
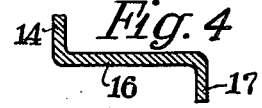
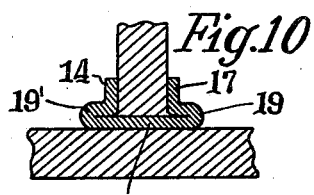
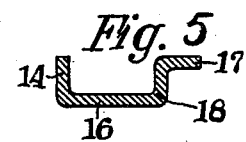
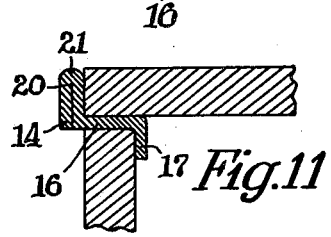
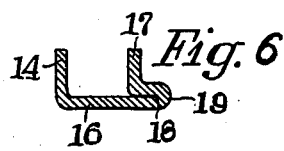
Inventor
Maurice Naëder
By Pennie Davis Marvin & Edmonds
Attorneys Patented June 7, 1938

2,119,999

UNITED STATES PATENT OFFICE 2,119,999

WELDING STRIP

Maurice Naëder, Paris, France

Application February 14, 1936, Serial No. 63,839
In France February 19, 1935

2 Claims. (Cl. 113—110)

In electric arc welding, with a carbon electrode, or in automatic welding with the oxyacetylene torch, the welding metal has, for some time past, been placed in position in the form of section strips of metal.

The manufacture of such section strips encounters a certain number of drawbacks. The most important is that this manufacture cannot be done in an economical manner. In fact, as is known, it is only economically possible to start a manufacture of rolled or drawn strips if a certain tonnage is to be produced. Now, in particular in the case of section strips of the kind in question, of the smallest types, this represents, in addition to a considerable length of section strip, very great difficulties of manufacture and a high cost.

On the other hand, such section strip must be extremely thin at the base or portion inserted between the two parts to be welded, for the welding process to give good results; their sides, however, must be of greater thickness, but well defined, to supply to the weld a necessary but not too great a mass of welding metal. They must also preferably be without superficial oxide which interferes with the weld. Furthermore, it is necessary to be able to produce such section strips in all metals, either in very costly ones such as stainless steel for example, or in those which are very difficult to roll or draw, such as certain nickel steels or copper, for example. It is also out of the question to start a manufacture which is necessarily very complex, whereas a few meters only of a costly material, such as fine quality steel or stainless steel for example, are required. In this case, it is also necessary for the section strip to have just sufficient weight to avoid a waste of metal and for the actual manufacture of the section strip to give, if possible, no waste.

The object of the present invention is to avoid these drawbacks and to fulfill these requirements.

For this purpose, the section welding strip according to the present invention is characterized by the fact that it is obtained in the required cross-section by forming a metal band. Such forming may be obtained by rolling, pressing, drawing or die-forming, for example. According to a characteristic of the invention, the section strip is formed so as to have an excess of material constituting the welding bead.

During the forming of the strip, a cavity may be reserved in one of the folds of the folded metal for receiving a cleaning material, a flux or a strip of additional metal.

Other advantages and peculiarities of the invention will become apparent from the ensuing description taken with reference to the accompanying drawing in which:

Fig. 1 shows in section a section strip obtained according to the invention.

Fig. 2 shows the application of said section strip to the process of butt welding two metal sheets.

Figs. 3 to 6 illustrate, by way of indication, the various stages of an example of manufacture of the section strip according to Fig. 1.

Figs. 7 and 8 show in section, section strips of other types.

Fig. 9 shows in section a welding strip according to the invention, provided with a cleaner, a flux or additional metal.

Fig. 10 shows the application of the section strip according to Fig. 7 to the welding of two metal plates one of which is welded by its end onto another.

Fig. 11 shows a section strip of another type used for welding two metal plates at right angles.

The welding strip 11 can have, for example, in cross-section the shape illustrated in Fig. 1. Said welding strip can be used for butt welding two metal plates in the manner illustrated in Fig. 2, a welding strip 11 or 11' being fitted onto the edge of each of the two metal plates 12 and 12' to be joined together, which are then made to abut in the manner shown in Fig. 2 after which the welding is done in the usual manner. In order to obtain this welding strip with the required cross-section, a rolled flat band 16 of metal is used, shown in section in Fig. 3. By successive forming, in the manner shown, for example, in Figs. 4, 5 and 6, said band of metal is given the cross-section of Fig. 6 which is that of Fig. 1. Thus the extremities 14 and 17 of the band 16 are first bent in opposite directions from each other as shown in Fig. 4. Then the extremity 17 is bent at 18 in the same direction as the other extremity 14 as indicated in Fig. 5. Finally, the doubly bent extremity 17 is folded back upon itself to produce the bead 19 as indicated in Fig. 6. The successive forming of the strip can be obtained in any suitable manner, for example by rolling, that is to say by passing the strip between rollers, or by drawing, that is to say passing in suitable dies, or by pressing, but of course any other method can be used and the forming of said strips could even be done by hand, by hammering, either entirely or in part. In the latter case, for example, the portion 14 of the section strip of Fig. 1 can be in the extension of the base 15 and only be bent back on the plate to be welded at the time of using.

The present section strips are in particular characterized by the fact that it is possible to use a metal of absolutely any quality, cold rolled and deoxidized, for example, and of the exact thickness which is desired. In view of the fact that to obtain sheets of metal of a very small and very accurate thickness and without oxide is a very usual and not very costly thing, it is thus possible to obtain the required thickness for the base 15 of the section strip. On the other hand, to form the welding bead of sufficient cross-section when such bead is necessary, the section strip is shaped by successively folding the metal on the side where this is required, so as to meet the requirements of the welding process.

It is obvious that the section strip according to the invention can have any other shape than that shown in Fig. 1 and that it is given in each case the cross-section necessitated by the type of weld to be effected. For example, in exactly the same manner, it can be given the cross-section illustrated in Fig. 7, in order to have an additional thickness on each of the two edges. This shape is obtained by the additional bending of the bent extremity 14 of Fig. 6 as carried out for the other extremity 17, whereby two beads 19 and 19' are obtained. Fig. 10 shows the application of this section strip to the welding of two metal sheets perpendicular to one another.

In the event of the additional thickness obtained with the type of Fig. 1 being insufficient for making the welding bead, the band of metal could be folded back on itself twice or even more, as shown at 18', in Fig. 8, thereby enabling a welding bead of greater thickness to be obtained if the weld requires it.

In Fig. 11, the use has been shown of a strip of suitable shape for welding two metal plates perpendicular to each other and forming an angle, for example the sides of a box. In this case the bent extremity 14 is folded back upon itself at 20 to produce bead 21.

Finally, as illustrated in Fig. 9 the two sides of a fold of the sheet metal may not be folded completely against each other, so as to leave a certain hollow 22, in which can be introduced a cleaning substance, a flux or a strip of additional metal 13, for example of aluminium.

It is obvious that the invention has only been illustrated in a purely explanatory and in no way limitative manner and that it could have any modifications of detail without altering its scope.

I claim:

1. The method of welding which comprises folding a piece of metal into angular form to provide a weld-insert having adjacent sides adapted to overlie adjacent sides of a piece of metal to be welded to another piece of metal, forming during said folding, a fold adjacent the angle formed by the adjacent sides, placing said weld-insert between the pieces of metal to be welded together with the weld-insert overlying adjacent sides of one of said pieces of metal, welding said pieces of metal and the weld-insert together and causing at least some of the excess metal provided by said fold to reinforce the welded joint between said pieces of metal.

2. A weld-insert comprising an angular member folded from a piece of flat metal and having adjacent sides adapted to overlie adjacent sides of a piece of metal to be welded to another piece of metal, said member being folded upon itself at least twice to provide a plurality of contiguous folds adjacent the angle formed by its said adjacent sides, whereby when said pieces of metal are welded together, said folds will provide an excess of metal at the joint between said pieces of metal.

MAURICE NAËDER.